(12) United States Patent
Park et al.

(10) Patent No.: US 11,566,131 B2
(45) Date of Patent: Jan. 31, 2023

(54) COMPOSITE RESIN COMPOSITION WITH EXCELLENT DIMENSIONAL STABILITY

(71) Applicants: Hyundai Motor Company, Seoul (KR); Kia Motors Corporation, Seoul (KR); Hyundai Advanced Materials Co., Ltd., Gyeonggi (KR)

(72) Inventors: Sang Sun Park, Gyeonggi-do (KR); Han Sol Lee, Gyeonggi-do (KR); Kyeong Bae Seo, Gyeonggi-do (KR); Min Sik Seo, Gyeonggi-do (KR); In Seok Kang, Incheon (KR); Wan Ki Noh, Gyeonggi-do (KR); Jae Han Park, Gyeonggi-do (KR); Dong Hyun Kim, Gyeonggi-do (KR); Hea Lin Kim, Gyeonggi-do (KR); Hyung Joo Lee, Seoul (KR); Seung Soo Hong, Gyeonggi-do (KR); Dong Chang Lee, Chungcheongnam-do (KR); Hyeung Min Lee, Gangwon-do (KR)

(73) Assignees: Hyundai Motor Company, Seoul (KR); Kia Motors Corporation, Seoul (KR); Hyundai Advanced Materials Co., Ltd., Gyeonggi-do (KR)

( * ) Notice: Subject to any disclaimer, the term of this patent is extended or adjusted under 35 U.S.C. 154(b) by 78 days.

(21) Appl. No.: 17/103,077

(22) Filed: Nov. 24, 2020

(65) Prior Publication Data

US 2022/0025177 A1   Jan. 27, 2022

(30) Foreign Application Priority Data

Jul. 22, 2020   (KR) .......................... 10-2020-0090851

(51) Int. Cl.
*C08L 77/06* (2006.01)

(52) U.S. Cl.
CPC ........... *C08L 77/06* (2013.01); *C08L 2205/02* (2013.01); *C08L 2205/03* (2013.01)

(58) Field of Classification Search
CPC ..... C08L 77/00–10; C08L 55/02; C08L 51/04
See application file for complete search history.

(56) References Cited

U.S. PATENT DOCUMENTS

| 10,526,486 B2 | 1/2020 | Miyamoto et al. |
| 2009/0202761 A1 | 8/2009 | Malek et al. |
| 2018/0237598 A1 | 8/2018 | Guo et al. |
| 2021/0277232 A1* | 9/2021 | Wilhelmus ............ B33Y 10/00 |

FOREIGN PATENT DOCUMENTS

| EP | 2423263 A1 | 2/2012 |
| EP | WO 2018046582 A1 * | 3/2018 |
| KR | 10-2020-0055223 A | 5/2020 |

OTHER PUBLICATIONS

EP 2423263 A1 machine translation (2012).*

* cited by examiner

*Primary Examiner* — Ana L. Woodward
(74) *Attorney, Agent, or Firm* — Fox Rothschild LLP

(57) ABSTRACT

Disclosed are a composite resin composition and an article containing the same. The composite resin composition may include semicrystalline polyamide; amorphous polyamide; an acrylonitrile-butadiene-styrene (ABS) resin; a compatibilizer; and a strength-reinforcing agent. The article may exhibit superior rigidity equivalent to or greater than that of conventional long-fiber thermoplastics and remarkably excellent dimensional stability. In addition, the composite resin composition and the molded article including the same may be used in replacement of steel parts so as to reduce the weight by about 30%.

9 Claims, No Drawings

COMPOSITE RESIN COMPOSITION WITH EXCELLENT DIMENSIONAL STABILITY

CROSS-REFERENCE TO RELATED APPLICATION

This application claims under 35 U.S.C. § 119(a) the benefit of priority to Korean Patent Application No. 10-2020-0090851, filed on Jul. 22, 2020, the entire contents of which are incorporated herein by reference.

TECHNICAL FIELD

The present invention relates to a composite resin composition having excellent dimensional stability, superior rigidity and reduced weight, and a molded article produced therefrom.

BACKGROUND

As high-strength and highly functional polymer materials are increasingly required in automobile industry, demand for plastic materials with improved flame retardancy, improved dimensional stability, high impact resistance, reduced weight, and improved tracking resistance have been increasing.

For example, as a thermoplastic resin, polyamide is a kind of engineered plastic, and has been used in various industrial fields due to the advantages thereof, namely high thermal stability and high mechanical rigidity. However, the range of use thereof has been limited due to deteriorated physical properties caused by hydrolysis in a humid environment and poor dimensional stability after injection molding.

In order to improve the dimensional stability of such polyamide resins, functional resins have recently been produced by applying a long-fiber thermoplastic (LFT) method to polyamide. However, since a long-fiber thermoplastic should be subjected to an additional secondary process of impregnating a plastic into long fibers after primary extrusion using a functional additive, processing costs are high. In addition, the material to which the LFT method is applied has very low flowability in a molten state and the polymer material is repeatedly melted at high temperatures, disadvantageously resulting in generation of gas in the final molded product due to the deterioration of the material.

In order to overcome the drawbacks of the prior art, there is a need for the development of resin compositions and molded articles thereof having performance equivalent to or higher than that of long-fiber thermoplastics as well as improved dimensional stability.

The above information disclosed in this Background section is only for enhancement of understanding of the background of the invention, and therefore it may contain information that does not form the prior art that is already known in this country to a person of ordinary skill in the art.

SUMMARY

In preferred aspects, provided is a composite resin composition having physical properties equivalent to or greater than those of long-fiber thermoplastics and improved dimensional stability. Particularly, the composite resin composition may include semicrystalline polyamide, amorphous polyamide, an acrylonitrile-butadiene-styrene (ABS) resin, a compatibilizer and a strength-reinforcing agent.

The objects of the present invention are not limited to those described above. The objects of the present invention will be clearly understood from the following description and could be implemented by means defined in the claims and a combination thereof.

In one aspect, provided is a composite resin composition including semicrystalline polyamide, amorphous polyamide, an acrylonitrile-butadiene-styrene (ABS) resin, a compatibilizer and a strength-reinforcing agent.

A term "semicrystalline" or "semicrystalline polymer" as used herein refers to a polymer or complex of monomers, which are partially or substantially packed or arranged in a specific order. The semicrystalline polymer may exhibit a degree of crystallinity of 10 and 80% between amorphous and perfect crystalline structures.

A term "amorphous" or "amorphous polymer" as used herein refers to a polymer or complex of monomers, which are oriented randomly and/or intertwined without regularity or coordination. The amorphous polymer may have a glass-like microstructure, not having a specific morphology.

The composite resin composition may include an amount of about 30 to 59% by weight of the semicrystalline polyamide, an amount of about 5 to 20% by weight of the amorphous polyamide, an amount of about 5 to 30% by weight of the acrylonitrile-butadiene-styrene (ABS) resin, an amount of about 0.5 to 5% by weight of the compatibilizer, and an amount of about 30 to 50% by weight of the strength-reinforcing agent. All the % by weight are based on the total weight of the composite resin composition.

The composite resin composition may further include an amount of about 0.1 to 10% by weight of an additive including one or more selected from the group consisting of light-resistant stabilizers, heat-resistant stabilizers, antioxidants, dispersants, lubricants, nucleating agents, releasing agents, metal ion stabilizers, flame retardants, dyes, and pigments.

The semicrystalline polyamide may have a relative viscosity, measured in a 98% sulfuric acid solvent, of about 2.0 to 2.7.

The semicrystalline polyamide may include one or more selected from the group consisting of polyamide 3, polyamide 4, polyamide 6, polyamide 8, polyamide 9, polyamide 11, polyamide 12, polyamide 6,6, polyamide 6,10, and polyamide 6,12.

The amorphous polyamide may have a relative viscosity, measured in a 98% sulfuric acid solvent, of about 1.7 to 2.4.

The ABS resin may have a melt flow index of about 15 to 40 g/min under a load of 10 kg at a temperature of 220° C.

The compatibilizer may include a styrene-N-phenylmaleimide copolymer.

The strength-reinforcing agent may include for example a flat glass fiber. Other fibers and polymers also may be used as a strength-reinforcing agent.

If a flat glass fiber is used as a strength-reinforcing agent, a cross section of the flat glass fiber suitably may have an aspect ratio (width/length) of about 2:1 to 4:1. The flat glass fiber also suitably may include one or more selected from the group consisting of $SiO_2$ and $AlO_2$.

The strength-reinforcing agent suitably also may further include a coupling agent. In another aspect, provided is a molded article produced from the composite resin composition described herein.

The molded article may be an automobile panorama sunroof frame.

Further provided is a vehicle including the molded article described herein.

Other aspects of the invention are discussed infra.

DETAILED DESCRIPTION

The objects described above, as well as other objects, features and advantages, will be clearly understood from the following preferred embodiments with reference to the attached drawings. However, the present invention is not limited to the embodiments, and may be embodied in different forms. The embodiments are suggested only to offer a thorough and complete understanding of the disclosed context and to sufficiently inform those skilled in the art of the technical concept of the present invention.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures, among other things.

For this reason, it should be understood that, in all cases, the term "about" should be understood to modify all numbers, figures and/or expressions. Unless otherwise indicated, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values.

Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous and include all numbers from the minimum to the maximum, including the maximum within each range, unless otherwise defined. Furthermore, when the range refers to an integer, it includes all integers from the minimum to the maximum including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include numbers such as 10%, 11%, 12% and 13% as well as 30%, and any sub-ranges, such as ranges of 10% to 15%, 12% to 18%, or 20% to 30%, as well as any numbers, such as 10.5%, 15.5% and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The composite resin composition (the "composition") may include semicrystalline polyamide, amorphous polyamide, an acrylonitrile-butadiene-styrene (ABS) resin, a compatibilizer, and a strength-reinforcing agent, and may further include an additive. Preferably, the composite resin composition may include an amount of about 30 to 59% by weight of the semicrystalline polyamide, an amount of about 5 to 20% by weight of the amorphous polyamide, an amount of about 5 to 30% by weight of the acrylonitrile-butadiene-styrene (ABS) resin, an amount of about 0.5 to 5% by weight of the compatibilizer, and an amount of about 30 to 50% by weight of the strength-reinforcing agent, based on the total weight of the composite resin composition. The composite resin composition may further include an amount of about 0.1 to 10% by weight of the additive.

The composite resin composition may include the components in the contents described above, so that the molded article produced therefrom has not only superior rigidity equivalent to or greater than that of conventional long-fiber thermoplastics, but also remarkably excellent dimensional stability. The composite resin composition is thus expected to be advantageously and widely used in the fields of automobile parts, electric and electronic part, and industrial materials.

The semicrystalline polyamide as used herein refers to a base resin, and is not particularly limited as long as it is polyamide that includes a crystalline portion and an amorphous portion in the skeleton.

The amorphous portion may include a chain randomly entangled with an amorphous polymer material, and the crystalline portion may include a region where a crystalline material is packed in an orderly arrangement of polymer chains, wherein the crystalline region may be embedded in an amorphous polymer matrix.

The semicrystalline polyamide may be polymerized using a conventional semicrystalline polyamide resin for example, caprolactam as a monomer. The semicrystalline polyamide may be a semicrystalline linear polymer constituting the main chain through an amide bond of —[CONH]—, preferably an aliphatic polyamide, for example, at least one selected from the group consisting of polyamide 3, polyamide 4, polyamide 6, polyamide 8, polyamide 9, polyamide 11, polyamide 12, polyamide 6,6, polyamide 6,10, polyamide 6,12 and a combination thereof, and more preferably, polyamide 6 having a low viscosity of 2.4 or less, which may have excellent injection moldability for large parts and excellent surface properties.

The semicrystalline polyamide may have a relative viscosity of about 2.0 to 2.7 measured in a 98% sulfuric acid solvent. When the relative viscosity of the semicrystalline polyamide is less than about 2.0, the mechanical strength of the molded article containing the composite resin composition including the semicrystalline polyamide may be reduced, and when the relative viscosity is greater than about 2.7, the alloy properties of the composite resin may be deteriorated and the appearance of the molded product may be deteriorated due to the difference of flowability with the amorphous polyamide and the acrylonitrile butadiene-styrene (ABS) resin.

The content of the semicrystalline polyamide may be about 30 to 59% by weight based on 100% by weight of the total composite resin composition. When the content of the semicrystalline polyamide is less than about 30% by weight, molding may not be properly performed due to a problem in moldability when producing a molded article from the composite resin composition including the same. When the content of the semicrystalline polyamide is greater than about 59% by weight, the molded article containing the same may have poor mechanical properties and may thus be difficult to use as a structural member.

The semicrystalline polyamide may be present in the total composite resin composition at the relative viscosity and the content described above, so the molded article including the composition may retain the rigidity and dimensional stability characteristics, and maintain excellent qualities due to the improvement in alloy properties attributable to low viscosity.

The amorphous polyamide is not particularly limited, as long as it is capable of delaying the crystallization rate of the composite resin composition and the molded article including the same, resulting in an excellent surface appearance of the molded article as the final product.

The amorphous polyamide may includea conventional amorphous polyamide that exhibits excellent transparency and excellent barrier properties to gases such as $O_2$ and $CO_2$, water and a solvent. For example, the amorphous polyamide may be a polymer having a form in which a terephthalic acid monomer in polyphthalamide is substituted with isophthalic acid, and may preferably be PA6I, which can remarkably improve the surface characteristics and dimensional stability of the injection-molded product due to the amorphous properties thereof when used as a mixture with a semicrystalline resin.

The amorphous polyamide may have a relative viscosity, measured in a 98% sulfuric acid solvent, of about 1.7 to 2.4, and a glass transition temperature of about 100 to 130° C. When the relative viscosity of the amorphous polyamide is less than about 1.7, the mechanical rigidity of the molded article containing the same may be lowered, and when the relative viscosity is greater than about 2.4, the alloy properties of the composite resin may be deteriorated and the appearance of the molded product may be deteriorated due to the difference of flowability with the amorphous polyamide and the acrylonitrile butadiene-styrene (ABS) resin. In addition, when the glass transition temperature of the amorphous polyamide is less than about 100° C., it may affect the injection cycle time, disadvantageously resulting in decreased production efficiency, and when the glass transition temperature of the amorphous polyamide is greater than about 130° C., the appearance of the injection-molded product is disadvantageously deteriorated.

The content of the amorphous polyamide may be about 5 to 20% by weight, preferably about 5 to 15% by weight, based on 100% by weight of the total composite resin composition. When the content of the amorphous polyamide is less than about 5% by weight, the effect of improving dimensional stability and appearance may be insufficient, and when the content of the amorphous polyamide is greater than about 20% by weight, the cooling rate may be slow during injection into a molded product, resulting in a prolonged cycle time and thus decreased productivity.

The amorphous polyamide may be present at the above relative viscosity and content in the composite resin composition, thereby improving the dimensional stability of a molded article including the same, and exhibiting advantages of overcoming the problem of warpage of the injection-molded article and of improving the appearance of the molded article through control of the crystallization of the semicrystalline polyamide when preparing the composite resin composition along with the semicrystalline polyamide.

The acrylonitrile-butadiene-styrene (ABS) resin may include a terpolymer polymerized using three monomers, namely acrylonitrile, butadiene and styrene, and may preferably include poly(acrylonitrile-co-butadiene-co-styrene).

The ABS resin may have a melt flow index of about 15 to 40 g/min, preferably about 20 to 35 g/min, under a load of 10 kg at a temperature of about 220° C. When the melt flow index of the ABS resin is less than about 15 g/min, the appearance of the injection surface of the resin may be disadvantageously deteriorated, and when the melt flow index of the ABS resin is greater than about 40 g/min, the mechanical properties of the material may be disadvantageously deteriorated.

The content of the ABS resin may be about 5 to 30% by weight, preferably about 10 to 30% by weight, based on 100% by weight of the total composite resin composition. When the content of the ABS resin is less than about 5% by weight, the effect of improving dimensional stability may be insufficient, and when the content of the ABS resin is greater than about 30% by weight, mechanical properties and heat resistance may be deteriorated.

The compatibilizer is not particularly limited, as long as it improves alloy properties between the semicrystalline polyamide, amorphous polyamide, and the ABS resin. The polyamide resin may preferably have a polar amide bond of —CONH— on the main chain, but the ABS resin may be a non-polar resin and thus may have low compatibility therewith. For this reason, rigidity, product appearance and dimensional stability may be deteriorated without the compatibilizer.

The compatibilizer may include a conventional compatibilizer that can be used in the present invention, and, without being limited to containing a specific component. The compatibilizer may include for example one or more selected from the group consisting of a styrene-N-phenylmaleimide copolymer, maleic-acid-grafted polystyrene and maleic-acid-grafted polyethylene, preferably include a styrene-N-phenyl maleimide copolymer, which prevents deterioration in heat resistance of the resin by alloying ABS.

The styrene-N-phenylmaleimide copolymer may preferably include a compound represented by Formula 1 below.

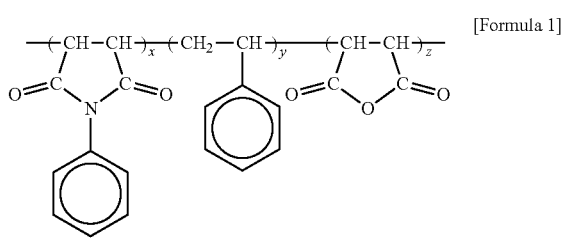

[Formula 1]

In Formula 1, x may be present in an amount of about 10% by weight to 30% by weight, y may be present in an amount of about 50% by weight to 90% by weight, and z may be present in an amount of about 0.5% by weight to 5% by weight.

For example, the styrene-N-phenyl maleimide copolymer may have an advantage of improving the compatibility of the polyamide resin and ABS resin because it is prepared by incorporating, as monomers, styrene, which improves the composite performance with the ABS resin, and maleic acid, which has excellent composite performance with the polyamide resin.

The compatibilizer may be prepared using an amount of about 50 to 90% by weight of the styrene monomer, an amount of about 10 to 30% by weight of an imide monomer, and an amount of about 0.5 to 5% by weight of the maleic acid monomer, based on 100% by weight of the total compatibilizer. When the content of the styrene monomer is less than about 50% by weight, compatibility with ABS is deteriorated, thus disadvantageously deteriorating the appearance and mechanical properties of the injection-molded product. When the content of the styrene monomer is greater than about 90% by weight, the content of the imide monomer decreases, disadvantageously resulting in decreased heat resistance and viscosity, and deteriorated alloy properties. In addition, when the content of the imide monomer is less than about 10% by weight, the heat resistance may be deteriorated, and when the content of the imide monomer is greater than about 30% by weight, the heat resistance of the compatibilizer may be excessively high and processability may be thus limited. In addition, when the content of the maleic acid monomer is less than about 0.5% by weight, compatibility with the polyamide resin may be poor and mechanical properties may be deteriorated. When the content of the maleic acid monomer is greater than about 5% by weight, the viscosity of the material becomes excessively high, the appearance of the injection-molded product may be deteriorated, and gas may be generated during injection.

The content of the compatibilizer may be about 0.5 to 5% by weight based on 100% by weight of the total composite resin composition. When the content of the compatibilizer is less than about 0.5% by weight, compatibility may be deteriorated and the mechanical properties of the material and the appearance of the injection-molded product may be thus deteriorated. When the content of the compatibilizer is greater than about 5% by weight, the mechanical properties may be reduced and gas may be generated during injection due to the excessive content of the compatibilizer.

The strength-reinforcing agent is not particularly limited, as long as it is capable of increasing the dimensional stability of a molded article including the same.

The strength-reinforcing agent may include a general strength-reinforcing agent. For example, the strength-reinforcing agent may include one or more selected from the group consisting of glass fiber, carbon fiber, and basalt fiber, and, without being limited to containing a specific component, preferably may include a glass fiber having excellent rigidity and price competitiveness.

The glass fiber may have a cross-section having a flat shape, a circular shape, or a combination thereof, and is not limited to a specific cross-section. Prefeably, the glass fiber may have a flat shape capable of preventing or reducing warpage, because the circular shape may cause warpage in injection-molded products due to the difference in shrinkage between the x, y, and z axes with respect to the injection flow direction. The glass fibers including a flat cross section may have a non-circular cross-section, for example, an elliptical cross-section, an oblong-circular cross-section, a rectangular cross-section, a cross-section in which a semicircle is connected to two short sides of a rectangle, or a cocoon cross-section, and is not limited to a cross section having any specific flat shape.

The aspect ratio (=width/length) of the cross section of the flat glass fiber may be about 2:1 to 4:1, or preferably 4:1. The aspect ratio (=width/length) of the flat glass-fiber cross section can be measured by observing the flat glass fiber cross section with a scanning electron microscope (SEM) to analyze the obtained image, and drawing a rectangle circumscribing the flat glass fiber cross section. The aspect ratio (=width/length) may be obtained by calculating the width (=length of $R_a$)/length (=length of $R_b$), wherein the width and the length are a horizontal length ($R_a$) and a vertical length ($R_b$), respectively, of a rectangle circumscribing the cross section of a flat glass fiber in each observed image.

The properties of the flat glass fiber may include those of E glass, T glass, NE glass, C glass, S glass, S2 glass, R glass and the like, and are not limited to specific properties. In addition, the flat glass fiber may include one or more selected from the group consisting of $SiO_2$, $AlO_2$, CaO and $B_2O_3$, and is not limited to including a specific component, but preferably includes all four components. The flat glass fiber may preferably further include a coupling agent in order to improve adhesion between the components of the composite resin composition containing the same, as well as to increase rigidity and dispersibility.

The content of the strength-reinforcing agent according to an embodiment of the present invention may be about 30 to 50% by weight based on 100% by weight of the total composite resin composition. When the content of the strength-reinforcing agent is less than about 30% by weight, mechanical properties are deteriorated, and when the content of the strength-reinforcing agent is greater than about 50% by weight, the appearance of the injection-molded product may be deteriorated and the weight of the injection-molded product may be increased, and thus the weight reduction effect may be deteriorated.

For example, by incorporating the strength-reinforcing agent in the composite resin composition and the molded article, balance between rigidity, dimensional stability and specific gravity may be preferably optimized and by incorporating the flat glass fiber therein, the dimensional stability of a molded article containing the same may be further obtained.

In addition, the composite resin composition may further include an additive. The additive may further include a conventional additive that can be used in the present invention, for example, one or more selected from the group consisting of light-resistant stabilizers, heat-resistant stabilizers, antioxidants, dispersants, lubricants, nucleating agents, releasing agents, metal ion stabilizers, flame retardants, dyes, and pigments, but is not limited to a specific component.

The content of the additive may be about 0.1 to 10% by weight, or preferably about 0.1 to 5% by weight, based on 100% by weight of the total composite resin composition. When the content of the additive is less than about 0.1% by weight, physical properties or performance such as light resistance may be deteriorated due to deterioration by external factors during processing and after product molding. When the content of the additive is greater than about 10% by weight, mechanical properties may be reduced due to the greater amount of low-molecular-weight material during processing, and gas may be generated during product molding.

The composite resin composition may include the above components in the amounts set forth above, thereby advantageously exhibiting superior rigidity equivalent to or higher than that of conventional long-fiber thermoplastics as well as particularly excellent dimensional stability.

A molded article may be produced by incorporating the composite resin composition. The molded article may be produced by blending the composite resin composition by a commonly used blending method and then extruding the result with a twin-screw extruder at a temperature of about 200 to 260° C., and further conducting various additional processes such as injection molding, blow molding, extrusion molding and press molding, preferably injection molding.

For example, the composite resin composition and the molded article produced therefrom may be be widely used in various vehicle parts, electrical and electronic parts, and industrial materials, particularly for parts that require a fine appearance for use in large injection-molding products and high rigidity and dimensional stability, such as panorama sunroof frames. In addition, the composite resin composition and the molded article containing the same enable replacement of parts previously made from steel, and thus have the advantage of reducing weight by about 30%.

EXAMPLE

Hereinafter, the present invention will be described in more detail with reference to specific examples. However, the following examples are provided only for illustration of the present invention, and thus should not be construed as limiting the scope of the present invention.

Examples 1 to 4 and Comparative Examples 1 to 6

Production of Article Samples Containing Composite Resin Composition

Composite resin compositions including the ingredients in the contents shown in the following Table 1 were mixed to homogeneity with a ribbon mixer and extrusion-molded at a temperature of 200 to 260° C. in a twin-screw extruder (L/D 40 and 40 mm) to produce pellets, and the samples were injection-molded at a temperature of 250 to 270° C. to produce respective article samples containing composite resin compositions according to Examples 1 to 4 and Comparative Examples 1 to 6.

TABLE 1

| | Semicrystalline polyamide | ABS resin | Compatibilizer | Amorphous polyamide | Strength-reinforcing agent (plate-shaped glass fiber) | Strength-reinforcing agent (general glass fiber) |
| --- | --- | --- | --- | --- | --- | --- |
| Example 1 | 39.0% | 10.0% | 1.0% | 10.0% | 40.0% | 0.0% |
| Example 2 | 37.5% | 10.0% | 2.5% | 10.0% | 40.0% | 0.0% |
| Example 3 | 39.0% | 15.0% | 1.0% | 5.0% | 40.0% | 0.0% |
| Example 4 | 39.0% | 5.0% | 1.0% | 15.0% | 40.0% | 0.0% |
| Comparative Example1 | 48.0% | 1.0% | 1.0% | 10.0% | 40.0% | 0.0% |
| Comparative Example 2 | 19.0% | 35.0% | 1.0% | 5.0% | 40.0% | 0.0% |
| Comparative Example 3 | 48.0% | 10.0% | 1.0% | 1.0% | 40.0% | 0.0% |
| Comparative Example4 | 19.0% | 5.0% | 1.0% | 35.0% | 40.0% | 0.0% |
| Comparative Example 5 | 39.9% | 10.0% | 0.1% | 10.0% | 40.0% | 0.0% |
| Comparative Example 6 | 39.0% | 10.0% | 1.0% | 10.0% | 0.0% | 40.0% |

Polyamide resin: polymerized using caprolactam and having a relative viscosity of 2.0 in a 98% sulfuric acid solvent ABS resin: having a melt flow index of 30 g/min at 220° C. and 10 kg Compatibilizer: styrene-N-phenylmaleimide copolymer Amorphous polyamide: polyphthalamide resin having an isophthalamide structure and having a relative viscosity of 2.0 in a 98% sulfuric acid solvent Flat glass fiber: having a diameter of 32 × 8 μm and a length of 3 mm Glass fiber: having a diameter of 1 μm and a length of 3 mm Measurement Methods The physical properties of the produced respective samples were measured in accordance with the following methods.

Tensile strength and elongation: ASTM D635
Flexural strength: ASTM D790
Impact strength: ASTM D256
Shrinkage: ASTM D955, resin flow direction (MD), direction transverse to resin flow (TD)
Injection warpage height: the height of the most bent portion in the flat mold
Injection appearance: having gloss visible to the naked eye and having no G/F protrusion Experimental Example Comparison of Dimensional Stability and Physical Properties Between Article Samples Produced from Composite Resin Compositions The dimensional stability and physical properties, such as tensile strength, of Examples 1 to 4 produced in accordance with Table 1 above according to an embodiment of the present invention and Comparative Examples 1 to 6 produced in accordance with Table 1 above and, as a control group, a long-fiber thermoplastic (LFT) material, which is a product containing 40% by weight of glass fiber in polyamide 6, were measured, and the results are shown in the following Table 2.

TABLE 2

| Item | Tensile strength (kgf/cm$^2$) | Tensile elongation (%) | Flexural strength (kgf/cm$^2$) | Impact strength (kgf cm/cm) | Shrinkage MD/TD (%) | Warpage height (mm) | Injection appearance |
|---|---|---|---|---|---|---|---|
| LFT material | 2,027 | 1.9 | 2,763 | 25.9 | 0.5/0.6 | 0.34 | good |
| Example 1 | 2,043 | 2.0 | 2,981 | 15.1 | 0.4/0.5 | 0.15 | excellent |
| Example 2 | 2,011 | 2.1 | 2,885 | 14.7 | 0.4/0.5 | 0.11 | excellent |
| Example 3 | 1,999 | 2.1 | 2,817 | 14.5 | 0.4/0.4 | 0.08 | excellent |
| Example 4 | 2,059 | 1.9 | 3,027 | 15.6 | 0.4/0.4 | 0.05 | excellent |
| Comparative Example 1 | 2,053 | 2.0 | 2,989 | 14.9 | 0.4/0.6 | 0.89 | excellent |
| Comparative Example 2 | 1,843 | 2.2 | 2,674 | 13.7 | 0.4/0.4 | 0.07 | poor |
| Comparative Example 3 | 1,953 | 2.0 | 2,895 | 14.7 | 0.4/0.7 | 1.29 | good |
| Comparative Example 4 | Poor cooling | ← | ← | ← | ← | ← | ← |
| Comparative Example 5 | 1,893 | 1.7 | 2,722 | 13.3 | 0.4/0.6 | 0.28 | poor |
| Comparative Example 6 | 1,924 | 1.9 | 2,884 | 13.8 | 0.5/0.9 | 3.91 | excellent |

As shown in Table 2 above, all of the articles produced from the composite resin compositions of Examples 1 to 4 exhibited excellent mechanical rigidity, injection appearance and dimensional stability. To the contrary, the articles or LFT materials produced from the composite resin compositions of Comparative Examples 1 to 6 exhibited low mechanical strength or deteriorated dimensional stability of articles and deteriorated appearance of injection-molded products.

Accordingly, the composite resin compositions and the articles containing the same in various exemplary embodiments of the present invention exhibited superior rigidity equivalent to or greater than that of conventional long-fiber thermoplastics and remarkably excellent dimensional stability, and thus are advantageously widely useful in the fields of automobile parts, electric and electronic parts, and industrial materials. In particular, the composite resin compositions and the articles containing the same in various exemplary embodiments of the present invention may be useful for parts that require a fine appearance in large injection-molding products as well as high rigidity and dimensional stability, such as panorama sunroof frames. In addition, the composite resin composition and the molded article containing the same according to various exemplary embodiments of the present invention may be used in replacement of steel parts, and thus have the advantage of reducing the weight by about 30%.

The effects of the present invention are not limited to those mentioned above. It should be understood that the effects of the present invention include all effects that can be inferred from the description of the present invention.

The present invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A composite resin composition comprising:
   an amount of 30 to 59% by weight of a semicrystalline polyamide;
   an amount of 5 to 20% by weight of an amorphous polyamide;
   an amount of 5 to 30% by weight of an acrylonitrile-butadiene-styrene (ABS) resin;
   an amount of 0.5 to 5% by weight of a compatibilizer; and
   an amount of 30 to 50% by weight of a strength-reinforcing agent,
   all the % by weight based on the total weight of the composite resin composition,
   wherein the compatibilizer comprises a styrene-N-phenylmaleimide copolymer; and
   wherein the strength-reinforcing agent comprises a flat glass fiber,
   wherein the semicrystalline polyamide has a relative viscosity, measured in a 98% sulfuric acid solvent, of 2.0 to 2.7, wherein the amorphous polyamide has a relative viscosity, measured in a 98% sulfuric acid solvent, of 1.7 to 2.4, wherein the amorphous polyamide has a glass transition temperature of 100 to 130° C.

2. The composite resin composition according to claim 1, further comprising:

an amount of about 0.1 to 10% by weight of an additive comprising one or more selected from the group consisting of light-resistant stabilizers, heat-resistant stabilizers, antioxidants, dispersants, lubricants, nucleating agents, releasing agents, metal ion stabilizers, flame retardants, dyes, and pigments.

3. The composite resin composition according to claim 1, wherein the semicrystalline polyamide comprises one or more selected from the group consisting of polyamide 3, polyamide 4, polyamide 6, polyamide 8, polyamide 9, polyamide 11, polyamide 12, polyamide 6,6, polyamide 6,10, and polyamide 6,12.

4. The composite resin composition according to claim 1, wherein the ABS resin has a melt flow index of about 15 to 40 g/min under a load of 10 kg at a temperature of 220° C.

5. The composite resin composition according to claim 1, wherein a cross section of the flat glass fiber has an aspect ratio (width/length) of about 2:1 to 4:1.

6. The composite resin composition according to claim 1, wherein the flat glass fiber comprises $SiO_2$ and $AlO_2$.

7. A molded article produced from a composite resin composition according to claim 1.

8. The molded article according to claim 7, wherein the molded article is an automobile panorama sunroof frame.

9. A vehicle comprising a molded article according to claim 7.

* * * * *